United States Patent
Wei et al.

(10) Patent No.: US 9,665,166 B2
(45) Date of Patent: May 30, 2017

(54) METHOD FOR ADJUSTING SHUTDOWN THRESHOLD VOLTAGE, STARTUP METHOD, AND ELECTRONIC DEVICES THEREOF

(71) Applicant: HUAWEI DEVICE CO., LTD., Shenzhen (CN)

(72) Inventors: Konggang Wei, Shenzhen (CN); Jie Zou, Shenzhen (CN); Qiang Xiong, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 231 days.

(21) Appl. No.: 14/547,518

(22) Filed: Nov. 19, 2014

(65) Prior Publication Data

US 2015/0121112 A1    Apr. 30, 2015

Related U.S. Application Data

(63) Continuation of application No. PCT/CN2013/085978, filed on Oct. 25, 2013.

(51) Int. Cl.
G06F 1/00 (2006.01)
G06F 1/32 (2006.01)
H04W 52/02 (2009.01)

(52) U.S. Cl.
CPC .......... G06F 1/3296 (2013.01); G06F 1/3212 (2013.01); G06F 1/3287 (2013.01);
(Continued)

(58) Field of Classification Search
CPC .................................................. G06F 1/3212
See application file for complete search history.

(56) References Cited

U.S. PATENT DOCUMENTS

2007/0094519 A1    4/2007  Yamamoto
2009/0107443 A1    4/2009  Sarbacker et al.
(Continued)

FOREIGN PATENT DOCUMENTS

CN    101330696    12/2008
CN    102299992    12/2011
(Continued)

OTHER PUBLICATIONS

Partial European Search Report dated Nov. 18, 2015 in corresponding European Patent Application No. 13883348.8.
(Continued)

*Primary Examiner* — Nitin Patel
(74) *Attorney, Agent, or Firm* — Staas & Halsey LLP

(57) ABSTRACT

The method for adjusting a shutdown threshold voltage includes: obtaining a current voltage of a battery of an electronic device; when the current voltage is greater than or equal to a lowest shutdown threshold of the electronic device and less than or equal to a general shutdown threshold of the electronic device, obtaining at least one piece of application information of at least one application program, where an application shutdown threshold of an application program corresponding to each piece of application information of the at least one piece of application information is greater than the lowest shutdown threshold and less than or equal to the current voltage; and setting a current shutdown threshold, which is corresponding to the current voltage, of the electronic device to a maximum application shutdown threshold of at least one application shutdown threshold corresponding to the at least one application program.

27 Claims, 7 Drawing Sheets

(52) U.S. Cl.
CPC ..... *H04W 52/0264* (2013.01); *Y02B 60/1292* (2013.01); *Y02B 60/50* (2013.01)

(56) References Cited

U.S. PATENT DOCUMENTS

2012/0210150 A1   8/2012   de Lind van Wijngaarden et al.
2013/0063097 A1   3/2013   Valentine

FOREIGN PATENT DOCUMENTS

| CN | 102883058 | 1/2013 |
| CN | 102999137 | 3/2013 |
| GB | 2 446 168 A | 8/2008 |
| JP | 2008-71149 | 3/2008 |
| JP | 2010-9538 | 1/2010 |
| JP | 2010-28578 | 2/2010 |
| JP | 2010-193345 | 9/2010 |
| JP | 2012-155425 | 8/2012 |
| JP | 2013-45373 | 3/2013 |
| WO | 2005/038638 A1 | 4/2005 |
| WO | 2008/101251 A1 | 8/2008 |
| WO | 2013/062578 A1 | 5/2013 |

OTHER PUBLICATIONS

Japanese Office Action dated Feb. 23, 2016 in corresponding Japanese Patent Application No. 2015-543275.
PCT International Search Report dated Aug. 4, 2014 in corresponding International Patent Application No. PCT/CN2013/085978.
Chinese Office Action dated Aug. 28, 2015 in corresponding Chinese Patent Application No. 201380003246.8.

METHOD FOR ADJUSTING SHUTDOWN THRESHOLD VOLTAGE, STARTUP METHOD, AND ELECTRONIC DEVICES THEREOF

CROSS-REFERENCE TO RELATED APPLICATIONS

This application is a continuation of International Application No. PCT/CN2013/085978, filed on Oct. 25,2013, which is hereby incorporated by reference in its entirety.

TECHNICAL FIELD

The present invention relates to the field of electronic technologies, and in particular, to a method for adjusting a shutdown threshold voltage, a startup method, and electronic devices thereof.

BACKGROUND

Chip platform capabilities of an electronic device are constantly strengthened along with continuous development of science and technology. Thanks to development from single-core CPUs to multi-core CPUs, a computing capability is constantly strengthened and more application programs are run simultaneously. In addition, screen sizes and resolution of electronic devices are also increased. Therefore, peak power consumption of electronic devices increases significantly.

In the prior art, when an electronic device runs, electricity consumption of a running platform and electricity consumption of application programs of the electronic device are two major sources of electricity consumption of the electronic device. In general cases, a running platform of an electronic device runs normally at a voltage greater than a lowest shutdown threshold. Once a voltage provided by a battery of the electronic device is lower than the lowest shutdown threshold, the running platform is aborted abnormally, which triggers an automatic shutdown of the electronic device. The abnormal abortion of the running platform of the electronic device does great harm to the electronic device, for example, losses of running data and disruptions to stability of the running platform. Therefore, in order to ensure that the voltage of the battery of the electronic device with heavy load does not drop below the lowest shutdown threshold of the running platform, a shutdown voltage, that is, a general shutdown threshold, is set to a high voltage.

However, because of the high shutdown voltage of the electronic device that is set, an excessive amount of electricity cannot be used efficiently, resulting in low utilization of battery electricity. It can be seen that, an electronic device in the prior art has a technical problem of low utilization of battery electricity.

SUMMARY

Embodiments of the present invention provide a method for adjusting a shutdown threshold voltage, a startup method, and electronic devices thereof, which are used to solve a technical problem of low utilization of battery electricity confronting an electronic device in the prior art.

According to a first aspect, the present invention provides a method for adjusting a shutdown threshold voltage, where the method includes:

obtaining a current voltage of a battery of an electronic device;

when the current voltage is greater than or equal to a lowest shutdown threshold of the electronic device and less than or equal to a general shutdown threshold of the electronic device, obtaining at least one piece of application information of at least one application program, where an application shutdown threshold of an application program corresponding to each piece of application information of the at least one piece of application information is greater than the lowest shutdown threshold and less than or equal to the current voltage; and based on the at least one piece of application information, setting a current shutdown threshold, which is corresponding to the current voltage, of the electronic device to a maximum application shutdown threshold of at least one application shutdown threshold corresponding to the at least one application program.

With reference to the first aspect, in a first possible implementation manner, the obtaining at least one piece of application information of at least one application program specifically includes:

displaying all available application programs, in the electronic device, of which application shutdown thresholds are less than or equal to the general shutdown threshold; and determining whether a user configures the at least one application program which is from all the available application programs; and if the user configures the at least one application program which is from all the available application programs, obtaining the at least one piece of application information of the at least one application program.

With reference to the first aspect, in a second possible implementation manner, during or before the setting a current shutdown threshold, which is corresponding to the current voltage, of the electronic device to a maximum application shutdown threshold of at least one application shutdown threshold corresponding to the at least one application program, the method further includes:

closing and disabling all unavailable application programs of which application shutdown thresholds are greater than the general shutdown threshold.

With reference to the first aspect, in a third possible implementation manner, the application shutdown threshold is specifically:

a voltage value obtained according to the lowest shutdown threshold, an internal resistance of the battery, and a peak current corresponding to the application program.

With reference to the first to third possible implementation manners, in a fourth possible implementation manner, after the setting a current shutdown threshold, which is corresponding to the current voltage, of the electronic device to a maximum application shutdown threshold of at least one application shutdown threshold corresponding to the at least one application program, the method further includes:

shielding a shutdown event triggered by the current voltage, and setting a global variable, which is used for indicating whether the current shutdown threshold of the electronic device is adjusted, to an adjusted identifier.

With reference to the fourth possible implementation manner, in a fifth possible implementation manner, after the setting a current shutdown threshold, which is corresponding to the current voltage, of the electronic device to a maximum application shutdown threshold of at least one application shutdown threshold corresponding to the at least one application program, the method further includes:

obtaining a subsequent voltage of the battery;

determining whether the subsequent voltage is greater than a threshold voltage, where the threshold voltage is greater than the general shutdown threshold; and when the subsequent voltage is greater than the threshold voltage, setting the current shutdown threshold of the electronic device to the general shutdown threshold.

With reference to the fifth possible implementation manner, in a sixth possible implementation manner, after the setting the current shutdown threshold of the electronic device to the general shutdown threshold, the method further includes:

adjusting a running mode of the electronic device to a full-function mode in which all application programs are runnable, and setting the global variable to an unadjusted identifier.

According to a second aspect, the present invention provides a startup method, where the method includes:

responding to a startup operation of a user, and detecting and obtaining a current voltage of a battery of an electronic device;

determining whether the current voltage is greater than a minimum startup threshold of the electronic device;

when the current voltage is greater than the minimum startup threshold, determining whether the current voltage is greater than a general startup threshold of the electronic device; and when the current voltage is not greater than the general startup threshold, controlling the electronic device to start a low-voltage startup process, so as to complete initialization of a minimum system and a display module of the electronic device.

With reference to the second aspect, in a first possible implementation manner, after the controlling the electronic device to start a low-voltage startup process, so as to complete initialization of a minimum system and a display module of the electronic device, the method further includes:

obtaining and displaying all available application programs, in the electronic device, of which application shutdown thresholds are less than or equal to the current voltage; and obtaining at least one application program which is from all the available application programs and configured by the user, and setting the at least one application program to a runnable state.

With reference to the first possible implementation manner of the second aspect, in a second possible implementation manner, during or after the obtaining at least one application program which is from all the available application programs and configured by the user, and setting the at least one application program to a runnable state, the method further includes:

obtaining at least one application shutdown threshold corresponding to the at least one application program; and setting a current shutdown threshold of the electronic device to a maximum application shutdown threshold of the at least one application shutdown threshold.

According to a third aspect, the present invention provides an electronic device, including:

a first obtaining unit, configured to obtain a current voltage of a battery of the electronic device;

a second obtaining unit, configured to: when the current voltage is greater than or equal to a lowest shutdown threshold of the electronic device and less than or equal to a general shutdown threshold of the electronic device, obtain at least one piece of application information of at least one application program, where an application shutdown threshold of an application program corresponding to each piece of application information of the at least one piece of application information is greater than the lowest shutdown threshold and less than or equal to the current voltage; and a setting unit, configured to set, according to the at least one piece of application information, a current shutdown threshold, which is corresponding to the current voltage, of the electronic device to a maximum application shutdown threshold of at least one application shutdown threshold corresponding to the at least one application program.

With reference to the third aspect, in a first possible implementation manner, the second obtaining unit is specifically configured to:

display all available application programs, in the electronic device, of which application shutdown thresholds are less than or equal to the general shutdown threshold; and determine whether a user configures the at least one application program which is from all the available application programs; and if the user configures the at least one application program which is from all the available application programs, obtain the at least one piece of application information of the at least one application program.

With reference to the first possible implementation manner of the third aspect, in a second possible implementation manner, the electronic device further includes:

a closing unit, configured to: when or before the current shutdown threshold, which is corresponding to the current voltage, of the electronic device is set to the maximum application shutdown threshold of the at least one application shutdown threshold corresponding to the at least one application program, close and disable all unavailable application programs of which application shutdown thresholds are greater than the general shutdown threshold.

With reference to the first possible implementation manner of the third aspect, in a third possible implementation manner, the application shutdown threshold is specifically a voltage value obtained according to the lowest shutdown threshold, an internal resistance of the battery, and a peak current corresponding to the application program.

With reference to the first to third possible implementation manners of the third aspect, in a fourth possible implementation manner, the electronic device further includes:

a shielding unit, configured to: after the current shutdown threshold, which is corresponding to the current voltage, of the electronic device is set to the maximum application shutdown threshold of the at least one application shutdown threshold corresponding to the at least one application program, shield a shutdown event triggered by the current voltage, and set a global variable, which is used for indicating whether the current shutdown threshold of the electronic device is adjusted, to an adjusted identifier.

With reference to the fourth possible implementation manner of the third aspect, in a fifth possible implementation manner, the electronic device further includes:

a third obtaining unit, configured to obtain a subsequent voltage of the battery after the current shutdown threshold, which is corresponding to the current voltage, of the electronic device is set to the maximum application shutdown threshold of the at least one application shutdown threshold corresponding to the at least one application program; and a determining unit, configured to determine whether the subsequent voltage is greater than a threshold voltage, where the threshold voltage is greater than the general shutdown threshold; and when the subsequent voltage is greater than the threshold voltage, the setting unit sets the current shutdown threshold of the electronic device to the general shutdown threshold.

With reference to the fifth possible implementation manner of the third aspect, in a sixth possible implementation manner, the electronic device further includes:

an adjustment unit, configured to: after the current shutdown threshold of the electronic device is set to the general shutdown threshold, adjust a running mode of the electronic device to a full-function mode in which all application programs are runnable, and set the global variable to an unadjusted identifier.

According to a fourth aspect, the present invention provides an electronic device, including:

a detection unit, configured to respond to a startup operation of a user, and detect and obtain a current voltage of a battery of the electronic device;

a first determining unit, configured to determine whether the current voltage is greater than a minimum startup threshold of the electronic device;

a second determining unit, configured to: when the current voltage is greater than the minimum startup threshold, determine whether the current voltage is greater than a general startup threshold of the electronic device; and a starting unit, configured to: when the current voltage is not greater than the general startup threshold, control the electronic device to start a low-voltage startup process, so as to complete initialization of a minimum system and a display module of the electronic device.

With reference to the fourth aspect, in a first possible implementation manner, the electronic device further includes:

a first obtaining unit, configured to: after the electronic device is controlled to start the low-voltage startup process, so as to complete initialization of the minimum system and the display module of the electronic device, obtain and display all available application programs, in the electronic device, of which application shutdown thresholds are less than or equal to the current voltage; and a running unit, configured to obtain at least one application program which is from all the available application programs and configured by the user, and set the at least one application program to a runnable state.

With reference to the first possible implementation manner of the fourth aspect, in a second possible implementation manner, the electronic device further includes:

a second obtaining unit, configured to: when or after the at least one application program which is from all the available application programs and configured by the user is obtained, and the at least one application program is set to the runnable state, obtain at least one application shutdown threshold corresponding to the at least one application program; and a setting unit, configured to set a current shutdown threshold of the electronic device to a maximum application shutdown threshold of the at least one application shutdown threshold.

According to a fifth aspect, the present invention provides an electronic device, including:

a memory, configured to store application information of an application program in the electronic device; and a processor, configured to: obtain a current voltage of a battery of the electronic device; when the current voltage is greater than or equal to a lowest shutdown threshold of the electronic device and less than or equal to a general shutdown threshold of the electronic device, obtain at least one piece of application information of at least one application program, where an application shutdown threshold of an application program corresponding to each piece of application information of the at least one piece of application information is greater than the lowest shutdown threshold and less than or equal to the current voltage; and set, according to the at least one piece of application information, a current shutdown threshold, which is corresponding to the current voltage, of the electronic device to a maximum application shutdown threshold of at least one application shutdown threshold corresponding to the at least one application program.

With reference to the fifth aspect, in a first possible implementation manner, the electronic device further includes:

a display, configured to display all available application programs, in the electronic device, of which application shutdown thresholds are less than or equal to the general shutdown threshold; and that the processor is configured to obtain the at least one piece of application information of the at least one application program is specifically to: determine whether a user configures the at least one application program which is from all the available application programs; and if the user configures the at least one application program which is from all the available application programs, obtain the at least one piece of application information of the at least one application program.

With reference to the fifth aspect, in a second possible implementation manner, the processor is further configured to:

when or before setting the current shutdown threshold, which is corresponding to the current voltage, of the electronic device to the maximum application shutdown threshold of the at least one application shutdown threshold corresponding to the at least one application program, close and disable all unavailable application programs of which application shutdown thresholds are greater than the general shutdown threshold.

With reference to the fifth aspect, in a third possible implementation manner, the application shutdown threshold is specifically a voltage value obtained according to the lowest shutdown threshold, an internal resistance of the battery, and a peak current corresponding to the application program.

With reference to the first to third possible implementation manners of the fifth aspect, in a fourth possible implementation manner, the processor is further configured to:

after setting the current shutdown threshold, which is corresponding to the current voltage, of the electronic device to the maximum application shutdown threshold of the at least one application shutdown threshold corresponding to the at least one application program, shield a shutdown event triggered by the current voltage, and set a global variable, which is used for indicating whether the current shutdown threshold of the electronic device is adjusted, to an adjusted identifier.

With reference to the fourth possible implementation manner of the fifth aspect, in a fifth possible implementation manner, the processor is further configured to:

after setting the current shutdown threshold, which is corresponding to the current voltage, of the electronic device to the maximum application shutdown threshold of the at least one application shutdown threshold corresponding to the at least one application program, obtain a subsequent voltage of the battery, and determine whether the subsequent voltage is greater than a threshold voltage, where the threshold voltage is greater than the general shutdown threshold; and when the subsequent voltage is greater than the threshold voltage, a setting unit sets the current shutdown threshold of the electronic device to the general shutdown threshold.

With reference to the fifth possible implementation manner of the fifth aspect, in a sixth possible implementation manner, the processor is further configured to:

after the current shutdown threshold of the electronic device is set to the general shutdown threshold, adjust a running mode of the electronic device to a full-function mode in which all application programs are runnable, and set the global variable to an unadjusted identifier.

According to a sixth aspect, the present invention provides an electronic device, including:

a memory, configured to store a minimum startup threshold and a general startup threshold of the electronic device; and a processor, configured to: respond to a startup operation of a user, and detect and obtain a current voltage of a battery of the electronic device; determine whether the current voltage is greater than the minimum startup threshold of the electronic device; when the current voltage is greater than the minimum startup threshold, determine whether the current voltage is greater than the general startup threshold of the electronic device; and when the current voltage is not greater than the general startup threshold, control the electronic device to start a low-voltage startup process, so as to complete initialization of a minimum system and a display module of the electronic device.

With reference to the sixth aspect, in a first possible implementation manner, the processor is further configured to:

after controlling the electronic device to start the low-voltage startup process, so as to complete initialization of the minimum system and the display module of the electronic device, obtain and display all available application programs, in the electronic device, of which application shutdown thresholds are less than or equal to the current voltage; and obtain at least one application program which is from all the available application programs and configured by the user, and set the at least one application program to a runnable state.

With reference to the first possible implementation manner of the sixth aspect, in a second possible implementation manner, the processor is further configured to:

when or after obtaining the at least one application program which is from all the available application programs and configured by the user, and setting the at least one application program to the runnable state, obtain at least one application shutdown threshold corresponding to the at least one application program; and set a current shutdown threshold of the electronic device to a maximum application shutdown threshold of the at least one application shutdown threshold.

One or more of the foregoing technical solutions in the embodiments of the present application have at least the following technical effects:

A current voltage of a battery of an electronic device is detected and obtained, and when the current voltage is greater than a lowest shutdown threshold of the electronic device but less than or equal to a general shutdown threshold of the electronic device, a current shutdown threshold of the electronic device is adjusted downward to a maximum application shutdown threshold, that is, a shutdown threshold of the electronic device is decreased. In this way, the electronic device can continue to run an application program of which an application shutdown threshold is less than or equal to the maximum application shutdown threshold, and more battery electricity of the electronic device is used, thereby solving a technical problem of low utilization of battery electricity confronting an electronic device in the prior art, and further achieving a technical effect of increasing utilization of battery electricity.

DESCRIPTION OF EMBODIMENTS

In technical solutions provided by the embodiments of the present application, a current voltage of a battery of an electronic device is obtained by means of detection, and when the current voltage is greater than a lowest shutdown threshold of the electronic device but less than or equal to a general shutdown threshold of the electronic device, a current shutdown threshold of the electronic device is adjusted downward to a maximum application shutdown threshold. In this way, the electronic device can continue to run an application program of which an application shutdown threshold is less than or equal to the maximum application shutdown threshold, thereby solving a technical problem of low utilization of battery electricity confronting an electronic device in the prior art, and achieving a technical effect of increasing utilization of battery electricity.

The following describes main implementation principles and specific implementation manners of the technical solutions provided by the embodiments of the present application and corresponding benefits that can be achieved in detail with reference to the accompanying drawings.

Embodiment 1

Figure 1:
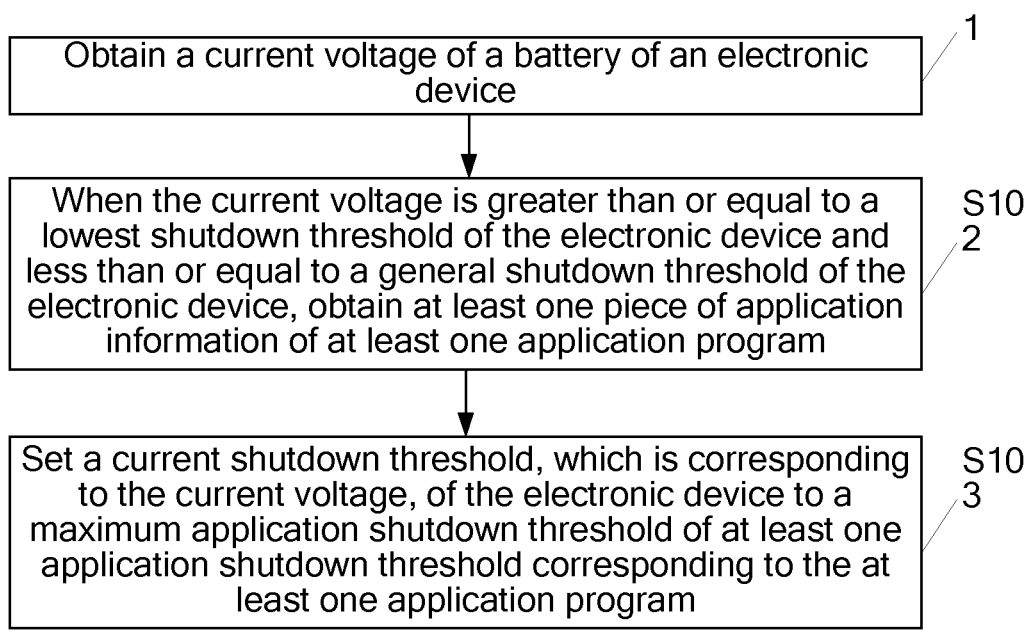
FIG. 1 is a schematic flowchart of a method for adjusting a shutdown threshold according to Embodiment 1 of the present invention.

Referring to FIG. 1, this embodiment of the present application provides a method for adjusting a shutdown threshold voltage. The method includes:

S101: Obtain a current voltage of a battery of an electronic device.

S102: When the current voltage is greater than or equal to a lowest shutdown threshold of the electronic device and less than or equal to a general shutdown threshold of the electronic device, obtain at least one piece of application information of at least one application program, where an application shutdown threshold of an application program corresponding to each piece of application information of the at least one piece of application information is greater than the lowest shutdown threshold and less than or equal to the current voltage.

S103: Based on the at least one piece of application information, set a current shutdown threshold, which is corresponding to the current voltage, of the electronic device to a maximum application shutdown threshold of at least one application shutdown threshold corresponding to the at least one application program.

In a specific implementation process, in order to make full use of battery electricity between the general shutdown threshold and the lowest shutdown threshold, in a running process, the electronic device executes S101 to obtain the current voltage of the battery of the electronic device. When the current voltage of the battery is greater than the general shutdown threshold, the electronic device allows all application programs to run and the current shutdown threshold of the electronic device is not changed; on the contrary, when the current voltage of the battery is less than or equal to the general shutdown threshold, in order that the electronic device can continue running, S102 is executed.

In S102, the at least one piece of application information of the at least one application program may be obtained in the following manner:

When the current voltage of the electronic device is greater than or equal to the lowest shutdown threshold and less than or equal to the general shutdown threshold, a display unit of the electronic device displays all available application programs, in the electronic device, of which application shutdown thresholds are less than or equal to the current voltage, so that a user can select an application program that needs to be run, and the user is prompted with: Low battery power. Please configure a low power consumption application or shut down the electronic device. Then, it is determined whether the user configures at least one application program which is from all the available application programs; if it is determined that the user configures the at least one application program, at least one piece of application information corresponding to the at least one application program is obtained, where each piece of application information includes a name, an application shutdown threshold, remaining available time, and the like of a corresponding application program, and the corresponding at least one piece of application information may be obtained from an application configuration table stored by the electronic device; and if it is determined that the user does not configure the at least one application program within a period of time, a shutdown process is started.

For example, if the lowest shutdown threshold is 2.7v, and the general shutdown threshold is 3.4v, when the current voltage of the electronic device is greater than or equal to 2.7v and less than or equal to 3.4v, the electronic device displays, on a display screen of the electronic device, all application programs of which application shutdown thresholds are less than or equal to 3.4v for the user to select. If the user selects at least one application program, for example, a "dialing" application program and an "address book" application program, the electronic device correspondingly obtains at least one piece of application information corresponding to the at least one application program selected by the user, for example, two pieces of application information corresponding to the "dialing" and "address book" application programs; if the user does not select any available application program within a preset period of time, the electronic device starts a shutdown process to shut down automatically.

After the at least one piece of application information of the at least one application program is obtained, S103 is executed to set the current shutdown threshold corresponding to the current voltage to the maximum application shutdown threshold of the at least one obtained application shutdown threshold corresponding to the at least one application program. An application shutdown threshold is the sum of the lowest shutdown threshold and a maximum transient voltage drop during running of a corresponding application program, and the application shutdown threshold may be obtained according to the lowest shutdown threshold Ve1, an internal resistance R of the battery, and a peak current i corresponding to the application program, for example, the application shutdown threshold is obtained by using (a formula) $Vn=Ve1+i*R$. In a running process of an application program, the battery of the electronic device generates a maximum transient voltage drop when providing a peak current for the application program. If a voltage of the battery is lower than the lowest shutdown threshold after the maximum transient voltage drop is generated, an undesirable condition of an abnormal shutdown may occur in the electronic device. Therefore, when the at least one application program is run in the electronic device, the current shutdown voltage of the electronic device is set to the maximum application shutdown threshold of the at least one application shutdown threshold, so as to ensure that the electronic device does not abnormally shut down when running the at least one application program.

In a specific implementation process, when or before the current shutdown threshold of the electronic device is set to the maximum application shutdown threshold of the at least one application shutdown threshold corresponding to the at least one application program, in the embodiment of the present application, all unavailable application programs of which application shutdown thresholds are greater than the general shutdown threshold are further closed and disabled.

As for whether an application program is available, when obtaining the current voltage, the electronic device sets an application program of which an application shutdown threshold is greater than or equal to the current voltage to be unavailable, and sets an "Available" item, in the application configuration table, of the application program to "No". The application configuration table includes application information of each application program. Besides information indicating whether each application programs is available, the application information further includes information such as an application name, an application priority, a function category, an application peak current, and an application shutdown threshold obtained according to the lowest shutdown threshold of the electronic device, the internal resistance of the battery, and the peak current corresponding to each application program. For example, assume that the electronic device is a mobile phone. The application configuration table in the mobile phone is as follows:

| Priority | Category | Application peak current | Application average current | Application name | Application shutdown threshold | Available currently |
|---|---|---|---|---|---|---|
| 1 | Basic mode | 500 | 100 | Address book, Notepad query, and on the like | . . . | |
| 2 | | 1000 | 150 | SMS message | . . . | |
| 3 | | 1000 | 120 | Limited call function | . . . | |
| . . . | | . . . | . . . | . . . | . . . | |
| . . . | Limited mode | 1000 | . . . | CPU frequency limit n | . . . | |
| . . . | | 1000 | . . . | CPU frequency limit n | . . . | |
| | | 1600 | . . . | Running in a single SIM card mode | . . . | |
| . . . | | . . . | . . . | . . . | . . . | |
| n − 2 | Full-function mode | 2200 | . . . | Dual-SIM dual-active | . . . | |
| n − 1 | | 2500 | . . . | Photographing (camera flash) | . . . | |
| n | | 2500 | . . . | A massive game | . . . | |
| . . . | | . . . | . . . | . . . | . . . | |

Figure 2:
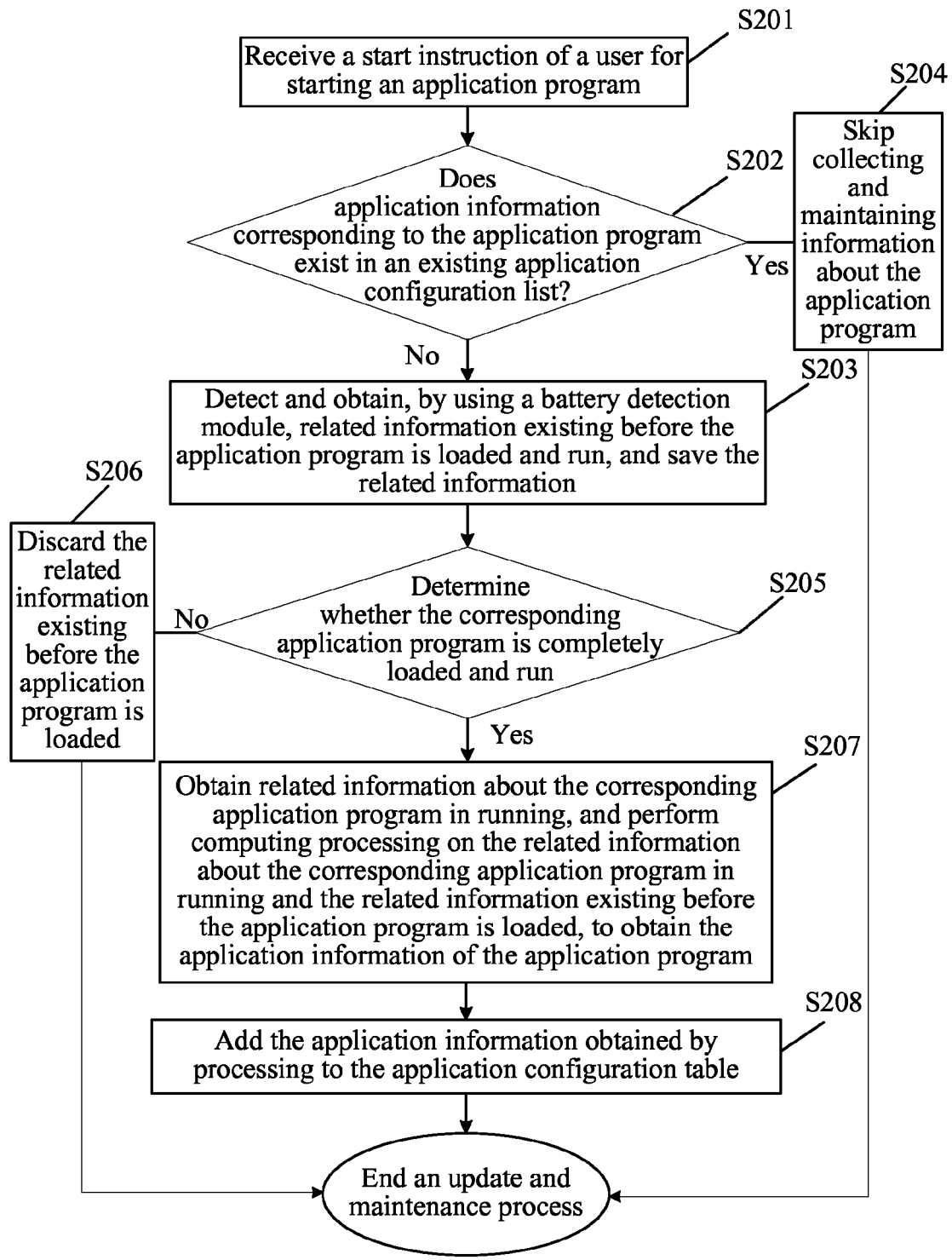
FIG. 2 is a schematic flowchart for updating and maintaining an application configuration table according to Embodiment 1 of the present invention.

In a specific implementation process, in addition to being pre-configured in the electronic device according to existing application programs in the electronic device before delivery, the foregoing application configuration table is further automatically updated and maintained by the electronic device when in use. For a specific update and maintenance process, refer to FIG. 2.

S201: Receive a start instruction of a user for starting an application program.

S202: Check whether application information corresponding to the application program exists in an existing application configuration table; and if the user does not configure the at least one application program which is from all the available application programs, execute S203; and if the user configures the at least one application program which is from all the available application programs, execute S204 to skip collecting and maintaining information about the application program, end the update and maintenance process, and load and run the corresponding application program.

S203: When it is detected that no application information corresponding to the application program exists in the existing application configuration table, detect and obtain, by using a battery detection module of the electronic device, related information existing before the application program is loaded and run, such as an application name of the application program and a voltage/current value of the battery, save the related information existing before the loading, load and run the corresponding application program, and then execute S205.

S205: Determine whether the corresponding application program is completely loaded and run; if the application program is not completely loaded and cannot be run, execute S206 to discard the related information existing before the application program is loaded, and end the update and maintenance process; and if the application program is completely loaded and run, execute S207.

S207: Detect and obtain, by using the battery detection module, related information of the corresponding application program in running, and perform computing processing on the related information of the corresponding application program in running and the related information existing before the application program is loaded, to obtain the application information of the application program. Specifically, the electronic device obtains an application peak current and an application average current of the application program according to voltage/current values of the battery in the related information existing before and after the application program is loaded. For example, assume that a peak current of the battery is 1000 milliampere before the application program is loaded and a peak current is 1500 milliampere after the application program is loaded and run. A difference of 500 milliampere between the peak currents before and after the application program is loaded is the application peak current of the application program; then an application shutdown threshold is obtained according to Ve1+i*R (where Ve1 indicates a lower limit of a working voltage of a running platform of the electronic device, that is, the lowest shutdown threshold, i indicates the application peak current of the application program, and R indicates the internal resistance of the battery). After the application information of the application program is obtained, S208 is executed.

S208: Add the application information obtained by processing to the application configuration table, and end the update and maintenance process.

In a specific implementation process, when a shutdown threshold of the electronic device is the general shutdown threshold and the electronic device detects that the current voltage is less than or equal to the general shutdown threshold, the electronic device triggers a shutdown event of the electronic device. Therefore, in the embodiment of the present application, after the current shutdown threshold of the electronic device is set to the maximum application shutdown threshold of the at least one application shutdown threshold corresponding to the at least one application program, the shutdown event triggered by the current voltage is further shielded, and a global variable, which is used for indicating whether the current shutdown threshold of the electronic device is adjusted, is set to an adjusted identifier. After the global variable is set to the adjusted identifier, the electronic device terminates adjustment of the shutdown threshold, so as to avoid repeatedly asking a user to configure an application program, thereby improving user experience.

In an actual application process, when a battery voltage of the electronic device is less than or equal to the general shutdown threshold, according to the technical solutions of the present application, an application program of which an application shutdown threshold is greater than the general shutdown threshold is closed and disabled. In this case, a required output current of the electronic device may decrease, and the battery voltage of the electronic device may increase. Therefore, a ping-pong effect in which the battery voltage fluctuates is likely to occur in the electronic device at a critical point of the general shutdown threshold. In order to prevent the ping-pong effect from occurring during the adjustment of the shutdown threshold voltage, in the embodiment of the present application, after the current shutdown threshold of the electronic device is set to the maximum application shutdown threshold of the at least one application shutdown threshold corresponding to the at least one application program, a subsequent voltage of the battery is then obtained; and it is determined whether the subsequent voltage is greater than or equal to a threshold voltage, where the threshold voltage is greater than the general shutdown threshold and is set by a designer according to performance of the electronic device. For example, if the general shutdown threshold is Ve2, and in a case in which the electronic device is not charged or the battery is replaced, a maximum range of the fluctuation of the battery voltage at the critical point is less than $\Delta V$, then the threshold voltage Vh may be set as Vh=Ve2+$\Delta V$. When the subsequent voltage is less than or equal to the threshold voltage, it indicates that the fluctuation of the battery voltage of the electronic device is caused by the ping-pong effect, and therefore no operation is performed; on the contrary, when the subsequent voltage is greater than the threshold voltage, it indicates that the electronic device has already been charged or the battery has already been replaced, and therefore the current shutdown threshold of the electronic device is set to the general shutdown threshold. In addition, after the current shutdown threshold of the electronic device is set to the general shutdown threshold, a running mode of the electronic device is adjusted to a full-function mode in which all application programs are runnable, and the global variable is set to an unadjusted identifier. The electronic device starts to execute the shutdown threshold voltage adjustment process again when the global variable is the unadjusted identifier.

Figure 3:
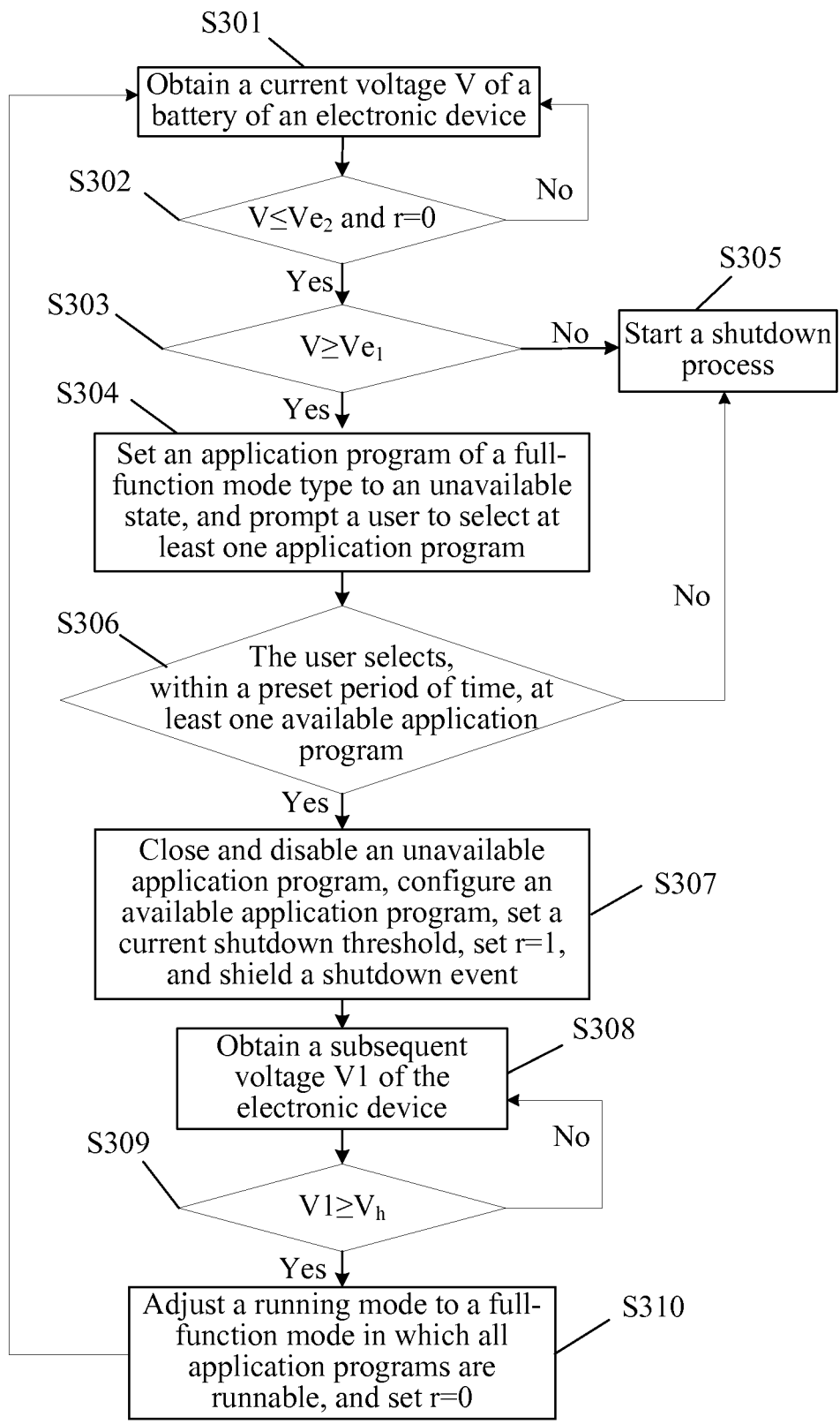
FIG. 3 is a flowchart of a specific example of adjusting a shutdown threshold according to Embodiment 1 of the present invention.

The following describes the foregoing shutdown threshold voltage adjustment process in detail with reference to a specific example. Referring to FIG. 3, r represents a global variable, Ve1 represents a lowest shutdown threshold, Ve2 represents a general shutdown threshold, V represents a current voltage of a battery of an electronic device, and Vh represents a threshold voltage. A shutdown threshold voltage adjustment process performed by the electronic device is as follows:

S301: Obtain the current voltage V of the battery of the electronic device, and then execute S302.

S302: Determine whether the current voltage V is less than or equal to the general shutdown threshold Ve2 and whether the global variable is an unadjusted identifier 0, that is, determine whether V≤Ve2 and r=0 are satisfied; if the user configures the at least one application program which is from all the available application programs, proceed to execute S303; and if no, proceed to obtain a current voltage of a next moment. Assume that Ve2=3.4v, the current r=0, and the obtained V=3.1v. Because 3.1v≤3.4v, it is determined that V≤Ve2 and r=0 are satisfied, and the process proceeds to S303.

S303: Further determine whether the voltage V is greater than or equal to the lowest shutdown threshold Ve1. When V≥Ve1, execute S304; otherwise, execute S305 to start a shutdown process. Assume that Ve1=2.7v, the obtained V=3.1v≥Ve1=2.7v, and the process proceeds to S304.

S304: Set an application program of a full-function mode type (that is, an application program of which an application shutdown threshold is greater than the general shutdown threshold) to an unavailable state, prompt a user to select at least one application program, which needs to be run, from a displayed application configuration table, and then execute S306.

S306: Determine whether the user selects, within a preset period of time, to run at least one available application program; if no, execute S305; and if the user configures the at least one application program which is from all the available application programs, continue to execute S307. For example, the user selects, according to the displayed application configuration table within the preset period of time, to run an "application program 1" and an "application program 2", and in this case, the process proceeds to S307.

S307: Close and disable an unavailable application program, obtain an available application program configured by the user, set a current shutdown threshold of the electronic device according to an application shutdown threshold corresponding to the available application program configured by the user, set the global variable r to an adjusted identifier 1, and shield a current shutdown event. For example, if an "application program 3" and an "application program 4" which are currently run by the electronic device are unavailable application programs, the "application program 3" and "application program 4" are closed and disabled, and application shutdown thresholds 2.8v and 3.0v of the "application program 1" and "application program 2", which are configured by the user, are obtained from application information in the application configuration table. Therefore, the current shutdown threshold of the electronic device is set to the larger application shutdown threshold 3.0v. Meanwhile, r=1 is set the current shutdown event is shielded, and the process proceeds to S308.

S308: Obtain a subsequent voltage V1 of the electronic device, and then execute S309.

S309: Determine whether the subsequent voltage V1 is greater than the threshold voltage Vh; if V1<Vh, return to S308 to obtain a subsequent voltage V1 of the electronic device at a next moment; and if V1≥Vh, execute S310.

S310: When the subsequent voltage V1 is greater than or equal to the threshold voltage, adjust a running mode of the electronic device to a full-function mode in which all application programs are runnable, set the global variable r to the unadjusted identifier 0, and then start to execute the shutdown threshold voltage adjustment process again. For example, the obtained subsequent voltage V1 is equal to 3.8v, and the threshold voltage Vh is equal to 3.5v; and it is determined that V1=3.8v>Vh=3.5v, which indicates that the electronic device is already connected to a power supply or the battery is already replaced. Therefore, the running mode is automatically adjusted to the full-function mode, the global variable r is set to 0, and the shutdown threshold voltage adjustment process starts to be executed again.

Figure 4:
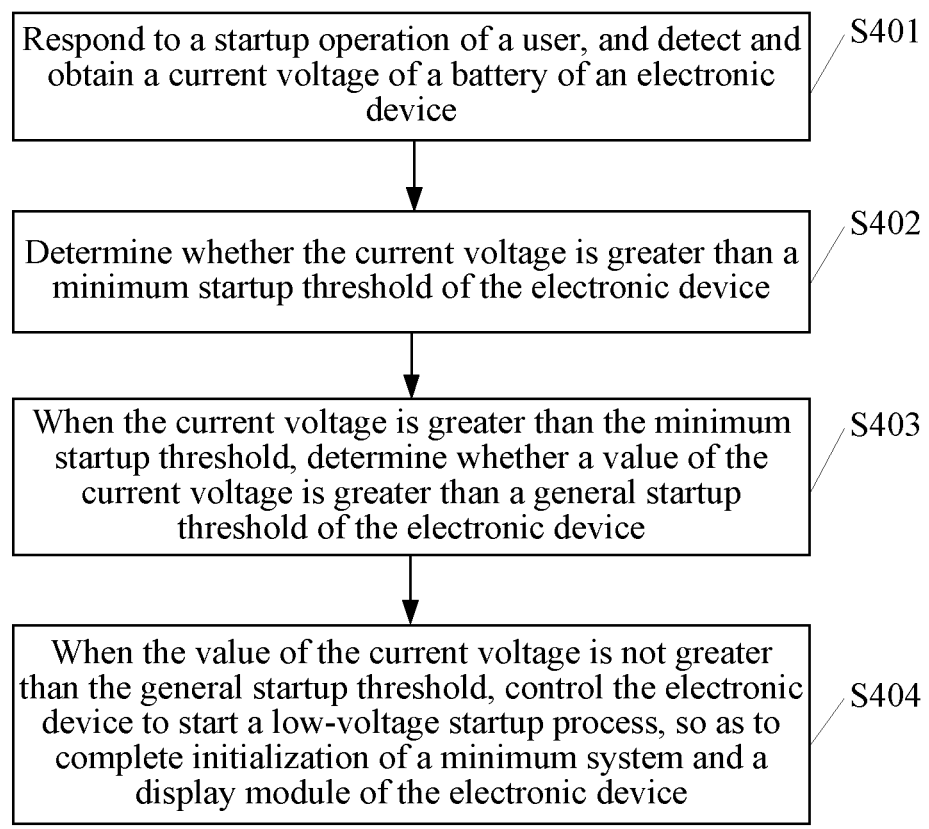
FIG. 4 is a schematic flowchart of a startup method according to Embodiment 1 of the present invention.

Referring to FIG. 4, the embodiment of the present application further provides a startup method, including:

S401: Respond to a startup operation of a user, and detect and obtain a current voltage of a battery of an electronic device.

S402: Determine whether the current voltage is greater than a minimum startup threshold of the electronic device.

S403: When the current voltage is greater than the minimum startup threshold, determine whether a value of the current voltage is greater than a general startup threshold of the electronic device.

S404: When the value of the current voltage is not greater than the general startup threshold, control the electronic device to start a low-voltage startup process, so as to complete initialization of a minimum system and a display module of the electronic device.

In a specific implementation process, after a user executes a startup operation on an electronic device, for example, presses and holds a startup button on the electronic device, the electronic device executes S401 to respond to the startup operation of the user, and detects and obtains a current voltage of a battery of the electronic device. The electronic device can start up and run only when the voltage is above a value; therefore, when responding to the startup operation of the user, the electronic device first needs to check the current voltage of the battery, and then executes S402 when the current voltage of the battery is detected and obtained.

In S402, it is determined whether the current voltage is greater than the minimum startup threshold of the electronic device, where the minimum startup threshold is a voltage required by the electronic device to run an application program that has a minimum voltage drop. When the current voltage of the battery is not greater than the minimum startup threshold, the electronic device terminates a subsequent operation, that is, the electronic device cannot start up in this case; on the contrary, when the current voltage of the battery is greater than the minimum startup threshold, the process proceeds to S403.

S403: When the current voltage is greater than the minimum startup threshold, determine whether the value of the current voltage is greater than a general startup threshold of the electronic device. In an actual application process, after starting up, the electronic device generally needs to run at least one application program, and running the at least one application program consumes battery electricity, which causes a voltage drop in a battery voltage. If the battery voltage is slightly greater than the minimum startup threshold, the battery voltage transiently drops below a lower limit of a platform working voltage of the electronic device, causing an abnormal shutdown of the electronic device. Therefore, the general startup threshold of the electronic device is set to a larger value. When the current voltage of the battery of the electronic device is greater than the general startup threshold, the electronic device starts a general startup process, and in the general startup process, the electronic device can run any application program; on the contrary, when the current voltage of the battery of the electronic device is not greater than the general startup threshold, the present application provides another startup method, in which S404 is executed.

S404: When the value of the current voltage is not greater than the general startup threshold, control the electronic device to start a low-voltage startup process, so as to complete initialization of a minimum system and a display module of the electronic device. Specifically, because the battery voltage of the electronic device is small, a lot of electricity is consumed if load in the startup process is excessively heavy, which is not good for an application program that the user needs to run urgently after the startup. Therefore, the low-voltage startup process is started, to complete the initialization of only the minimum system and the display module of the electronic device, thereby reducing consumption of the battery electricity.

After the electronic device completes the initialization of the minimum system and the display module of the electronic device, in order to prevent an abnormal shutdown of the electronic device caused by use of a high-electricity-consumption application program by the user, and meet a requirement of urgent startup of the user to the greatest extent, all available application programs, in the electronic device, of which application shutdown thresholds are less than or equal to the current voltage of the battery are obtained and displayed; then at least one application program which is from all the available application programs and configured by the user is obtained, and the at least one application program is set to a runnable state, that is, the at least one application program configured by the user can be run after low-voltage startup of the electronic device. Specifically, the electronic device may obtain, from an application configuration table, all the available application programs of which the application shutdown thresholds are less than or equal to the general startup threshold. An application program which the electronic device allows to run is a program which the user needs to run and of which an application shutdown threshold is less than the current voltage of the electronic device. Therefore, not only a requirement of the user can be well met, but it can also be ensured that the electronic device does not abnormally shut down within a short period of time. Certainly, after the low-voltage startup of the electronic device, another application program of which an application shutdown threshold is less than a maximum application shutdown threshold corresponding to the at least one application program configured by the user may also be run.

In a specific implementation process, before or when obtaining and displaying all the available application programs, in the electronic device, of which the application shutdown thresholds are less than or equal to the current voltage of the battery, the electronic device displays indication information, to ask the user whether to confirm the low-voltage startup. When the user confirms the low-voltage startup, all the available application programs are obtained and displayed for the user to select and configure; on the contrary, when the user does not adopt the low-voltage startup, all operations are terminated, and the electronic device is shut down.

When or after obtaining the at least one application program which is from all the available application programs and configured by the user, and setting the at least one application program to the runnable state, the electronic device obtains at least one application shutdown threshold corresponding to the at least one application program configured by the user; and sets a current shutdown threshold of the electronic device to a maximum application shutdown threshold of the at least one application shutdown threshold, that is, the current shutdown threshold of the electronic device is updated. When or after the current shutdown threshold of the electronic device is updated, a global variable used for identifying whether the shutdown threshold is adjusted may be further set to an adjusted identifier, so as to prevent the electronic device from repeatedly adjusting the shutdown threshold.

The current shutdown threshold of the electronic device is updated; therefore, when the battery voltage is lower than the updated shutdown threshold, a normal shutdown process is automatically started, so that the electronic device does not continue running after the voltage is lower than the application shutdown threshold, thereby preventing an abnormal shutdown of the electronic device caused by the battery voltage being lower than a lower limit of a working voltage of a running platform.

Figure 5:
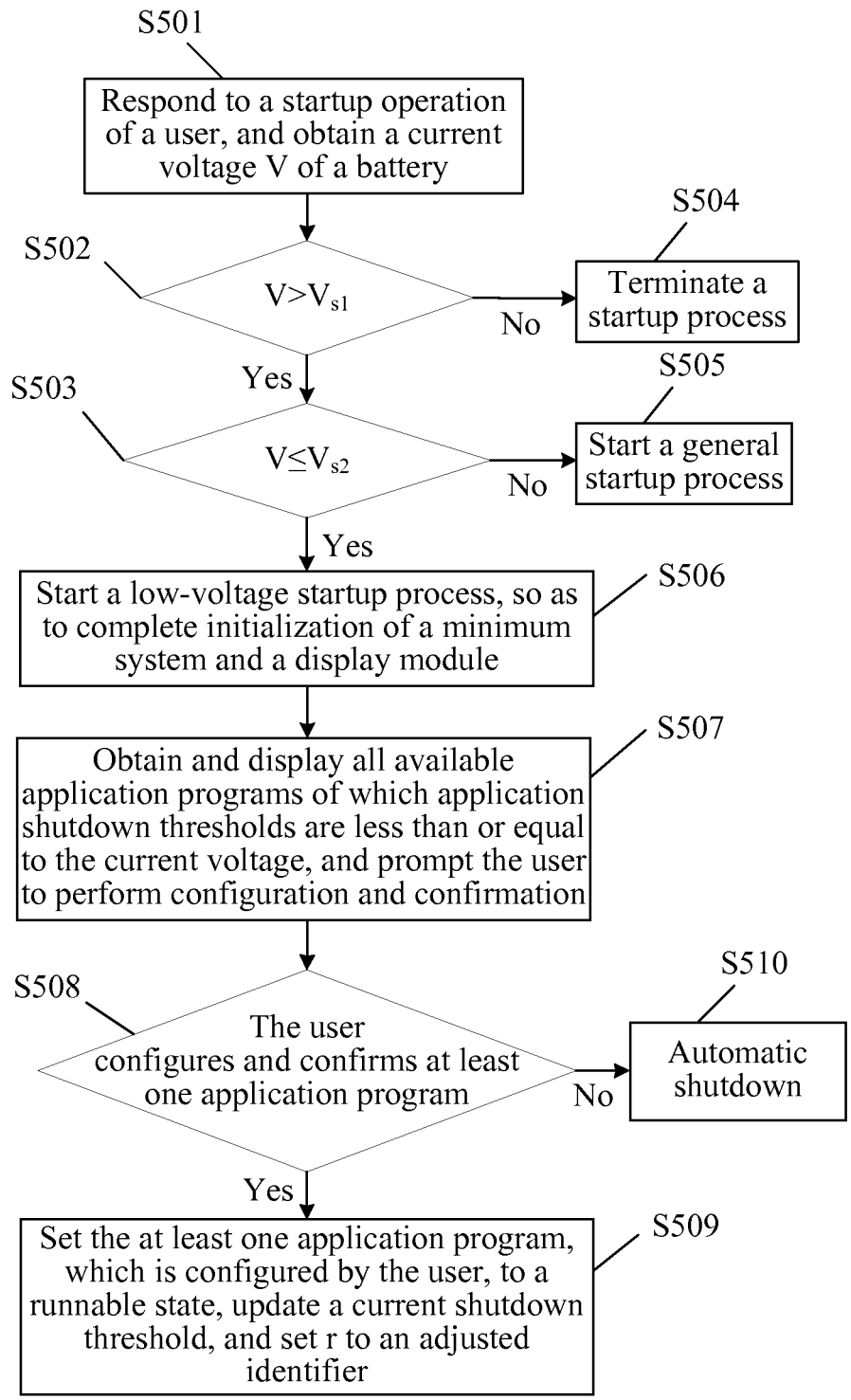
FIG. 5 is a schematic diagram of a startup process and a running process according to Embodiment 1 of the present invention.

Referring to FIG. 5, the following describes a startup process and a running process of an electronic device in detail with reference to a specific example.

S501: Respond to a startup operation of a user, and obtain a current voltage V of a battery. For example, after a user presses and holds a startup button of an electronic device, the electronic device responds to the startup operation of the user, obtains that a current voltage V of a battery of the electronic device is 3.1v, and proceeds to execute S502.

S502: Determine whether the condition that the current voltage V>Vs1 is satisfied, where Vs1 is a minimum startup threshold of the electronic device; if V>Vs1 is satisfied, execute S503; and otherwise, if V>Vs1 is not satisfied, execute S504 to terminate the startup process. For example, assume that Vs1=2.8v, and it is obtained that the current voltage V is equal to 3.1v as is described in the foregoing step. Because 3.1v>2.8v, it is determined that V>Vs1 is satisfied, and the process proceeds to S503.

S503: Determine whether the current voltage V≤Vs2 is satisfied, where Vs2 is a general startup threshold of the electronic device; if V≤Vs2 is satisfied, execute S504; and otherwise, if V≤Vs2 is not satisfied, execute S505 to start a general startup process. For example, assume that Vs2=3.4v, and it is obtained that the current voltage V is equal to 3.1v as is described in the foregoing step. Because 3.1v<3.4v, it is determined that V≤Vs2 is satisfied, and the process proceeds to S506.

S506: Start a low-voltage startup process, so as to complete initialization of a minimum system and a display module of the electronic device, and then proceed to execute S507.

S507: Obtain and display all available application programs, in the electronic device, of which application shutdown thresholds are less than or equal to the current voltage, and prompt the user to configure and confirm an available application program. For example, the electronic device displays three available application programs: an "application program 1", an "application program 2", and an "application program 3", provides the user with "please configure and confirm an application program that needs to be run", and then executes S508.

S508: Determine whether the user configures and confirms at least one application program; if the user configures the at least one application program which is from all the available application programs, proceed to execute S509; if no, proceed to execute S510 to shut down automatically. For example, if the user selects the "application program 1" and "application program 3" from the three available application programs "application program 1", "application program 2", and "application program 3", and confirms them, the process proceeds to S509.

S509: Set the at least one application program, which is configured by the user, to a runnable state, update a current shutdown threshold of the electronic device, and set a global variable r to an adjusted identifier. Specifically, when the current shutdown threshold of the electronic device is updated, at least one application shutdown threshold corresponding to the at least one application program may be obtained from an application configuration table in the electronic device, and the current shutdown threshold of the electronic device is set to a maximum application shutdown threshold of the at least one application shutdown threshold. For example, in the foregoing step, the user selects the available application programs "application program 1" and "application program 3"; therefore, the electronic device runs the "application program 1" and "application program 3", and obtains from the application configuration table of the electronic device that application shutdown thresholds of the "application program 1" and "application program 3" are 3.0v and 2.9v respectively. The electronic device therefore sets the current shutdown threshold of the electronic device to the larger application shutdown threshold 3.0v, and sets the global variable r to the adjusted identifier 1 (r=0 indicates an unadjusted identifier, and in this case, the electronic device may adjust the shutdown threshold; r=1 indicates the adjusted identifier, and in this case, the electronic device no longer adjusts the shutdown threshold).

Embodiment 2

Figure 6:
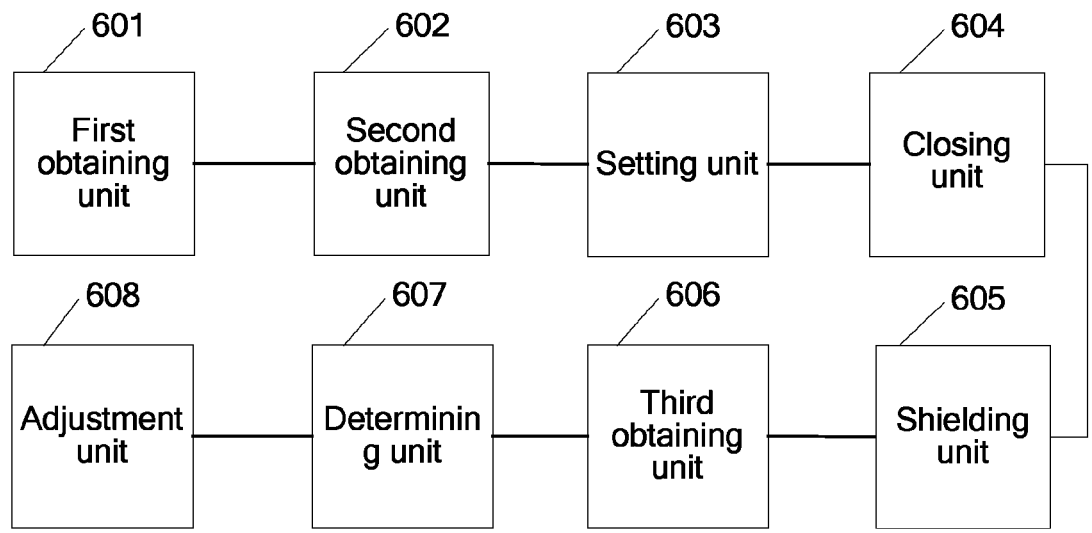
FIG. 6 is a structural block diagram of a first type of electronic device according to Embodiment 2 of the present invention.

Referring to FIG. 6, this embodiment of the present application provides a first type of electronic device, including:

a first obtaining unit 601, configured to obtain a current voltage of a battery of the electronic device;

a second obtaining unit 602, configured to: when the current voltage is greater than or equal to a lowest shutdown threshold of the electronic device and less than or equal to a general shutdown threshold of the electronic device, obtain at least one piece of application information of at least one application program, where an application shutdown threshold of an application program corresponding to each piece of application information of the at least one piece of application information is greater than the lowest shutdown threshold and less than or equal to the current voltage; and a setting unit 603, configured to set, according to the at least one piece of application information, a current shutdown threshold, which is corresponding to the current voltage, of the electronic device to a maximum application shutdown threshold of at least one application shutdown threshold corresponding to the at least one application program.

In a specific implementation process, the second obtaining unit 602 is specifically configured to:

display all available application programs, in the electronic device, of which application shutdown thresholds are less than or equal to the general shutdown threshold; and determine whether a user configures the at least one application program which is from all the available application programs; and if the user configures the at least one application program which is from all the available application programs, obtain the at least one piece of application information of the at least one application program.

Preferably, the electronic device further includes:

a closing unit 604, configured to: when or before the current shutdown threshold, which is corresponding to the current voltage, of the electronic device is set to the maximum application shutdown threshold of the at least one application shutdown threshold corresponding to the at least one application program, close and disable all unavailable application programs of which application shutdown thresholds are greater than the general shutdown threshold.

Preferably, the application shutdown threshold is specifically a voltage value obtained according to the lowest shutdown threshold, an internal resistance of the battery, and a peak current corresponding to the application program.

In a specific implementation process, the electronic device further includes:

a shielding unit 605, configured to: after the current shutdown threshold, which is corresponding to the current voltage, of the electronic device is set to the maximum application shutdown threshold of the at least one application shutdown threshold corresponding to the at least one application program, shield a shutdown event triggered by the current voltage, and set a global variable, which is used for indicating whether the current shutdown threshold of the electronic device is adjusted, to an adjusted identifier.

Preferably, the electronic device further includes:

a third obtaining unit 606, configured to obtain a subsequent voltage of the battery after the current shutdown threshold, which is corresponding to the current voltage, of the electronic device is set to the maximum application shutdown threshold of the at least one application shutdown threshold corresponding to the at least one application program;

a determining unit 607, configured to determine whether the subsequent voltage is greater than a threshold voltage, where the threshold voltage is greater than the general shutdown threshold; and when the subsequent voltage is greater than the threshold voltage, the setting unit 603 sets the current shutdown threshold of the electronic device to the general shutdown threshold.

In order that the electronic device can resume a full-function mode, the electronic device further includes:

an adjustment unit 608, configured to: after the current shutdown threshold of the electronic device is set to the general shutdown threshold, adjust a running mode of the electronic device to a full-function mode in which all application programs are runnable, and set the global variable to an unadjusted identifier.

Varied manners and specific examples in the foregoing method for adjusting a shutdown threshold voltage are also applicable to the first type of electronic device in this embodiment. From the detailed description of the foregoing method for adjusting a shutdown threshold voltage, a person skilled in the art can clearly understand an implementation method for the first type of electronic device in this embodiment. Therefore, for brevity of this specification, details are not described herein again.

Figure 7:
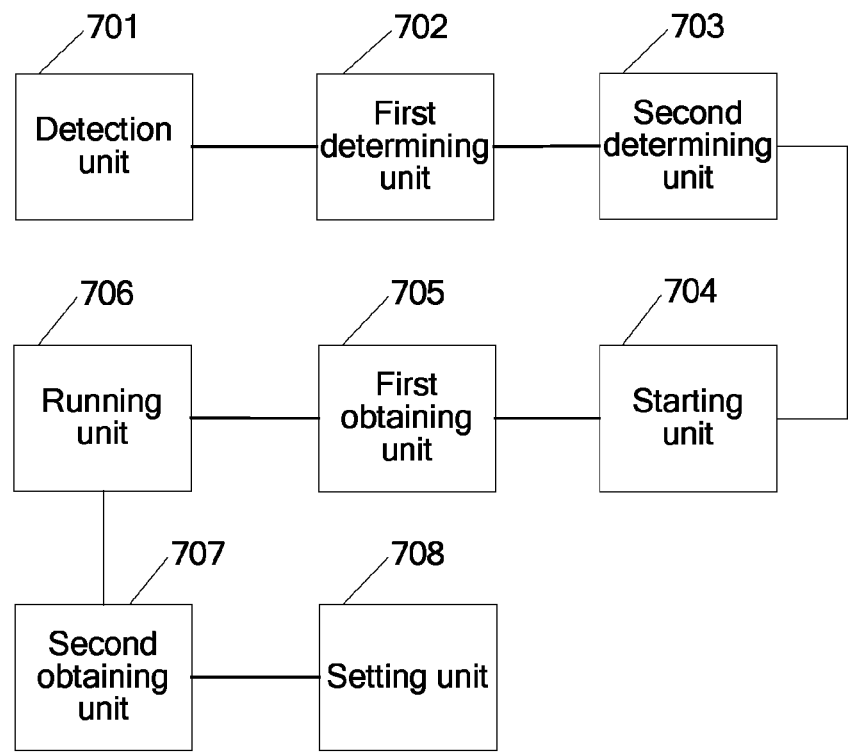
FIG. 7 is a structural block diagram of a second type of electronic device according to Embodiment 2 of the present invention.

Referring to FIG. 7, the embodiment of the present application further provides a second type of electronic device, including:

a detection unit 701, configured to respond to a startup operation of a user, and detect and obtain a current voltage of a battery of the electronic device;

a first determining unit 702, configured to determine whether the current voltage is greater than a minimum startup threshold of the electronic device;

a second determining unit 703, configured to: when the current voltage is greater than the minimum startup threshold, determine whether the current voltage is greater than a general startup threshold of the electronic device; and a starting unit 704, configured to: when the current voltage is not greater than the general startup threshold, control the electronic device to start a low-voltage startup process, so as to complete initialization of a minimum system and a display module of the electronic device.

In a specific implementation process, the electronic device further includes:

a first obtaining unit 705, configured to: after the electronic device is controlled to start the low-voltage startup process, so as to complete initialization of the minimum system and the display module of the electronic device, obtain and display all available application programs, in the electronic device, of which application shutdown thresholds are less than or equal to the current voltage; and a running unit 706, configured to obtain at least one application program which is from all the available application programs and configured by the user, and set the at least one application program to a runnable state.

In order to prevent an abnormal shutdown of the electronic device after the startup, the electronic device further includes:

a second obtaining unit 707, configured to: when or after the at least one application program which is from all the available application programs and configured by the user is obtained, and the at least one application program is set to the runnable state, obtain at least one application shutdown threshold corresponding to the at least one application program; and a setting unit 708, configured to set a current shutdown threshold of the electronic device to a maximum application shutdown threshold of the at least one application shutdown threshold.

Varied manners and specific examples in the foregoing startup method are also applicable to the second type of electronic device in this embodiment. From the detailed description of the foregoing startup method, a person skilled in the art can clearly understand an implementation method for the second type of electronic device in this embodiment. Therefore, for brevity of this specification, details are not described herein again.

In a specific implementation process, the functional units in FIG. 6 and FIG. 7 may be set in a same entity device, that is, by selecting different functional units according to requirements, the electronic device can implement not only shutdown threshold voltage adjustment but also low-voltage startup.

Embodiment 3

Figure 8:
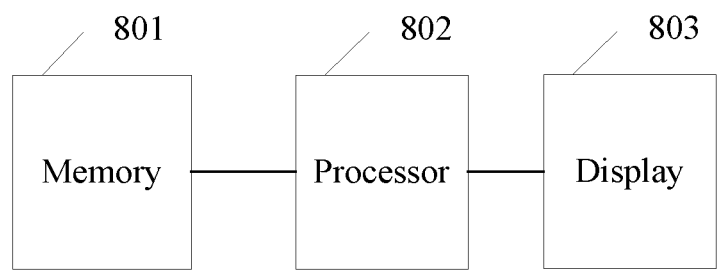
FIG. 8 is a structural block diagram of a first type of electronic device according to Embodiment 3 of the present invention.

Referring to FIG. 8, this embodiment of the present application provides a first type of electronic device, including:

a memory 801, configured to store application information of an application program in the electronic device; and a processor 802, configured to: obtain a current voltage of a battery of the electronic device; when the current voltage is greater than or equal to a lowest shutdown threshold of the electronic device and less than or equal to a general shutdown threshold of the electronic device, obtain at least one piece of application information of at least one application program, where an application shutdown threshold of an application program corresponding to each piece of application information of the at least one piece of application information is greater than the lowest shutdown threshold and less than or equal to the current voltage; and set, according to the at least one piece of application information, a current shutdown threshold, which is corresponding to the current voltage, of the electronic device to a maximum application shutdown threshold of at least one application shutdown threshold corresponding to the at least one application program.

In a specific implementation process, the electronic device further includes:

a display 803, configured to display all available application programs, in the electronic device, of which application shutdown thresholds are less than or equal to the general shutdown threshold; and that the processor 802 is configured to obtain the at least one piece of application information of the at least one application program is specifically to: determine whether a user configures the at least one application program which is from all the available application programs; and if the user configures the at least one application program which is from all the available application programs, obtain the at least one piece of application information of the at least one application program.

In a specific implementation process, in order to reduce electricity consumption of the electronic device, the processor 802 is further configured to:

when or before setting the current shutdown threshold, which is corresponding to the current voltage, of the electronic device to the maximum application shutdown threshold of the at least one application shutdown threshold corresponding to the at least one application program, close and disable all unavailable application programs of which application shutdown thresholds are greater than the general shutdown threshold.

In a specific implementation process, the application shutdown threshold is specifically a voltage value obtained according to the lowest shutdown threshold, an internal resistance of the battery, and a peak current corresponding to the application program.

In order to prevent the electronic device from repeatedly adjusting the shutdown threshold, the processor 802 is further configured to:

after setting the current shutdown threshold, which is corresponding to the current voltage, of the electronic device to the maximum application shutdown threshold of the at least one application shutdown threshold corresponding to the at least one application program, shield a shutdown event triggered by the current voltage, and set a global variable, which is used for indicating whether the current shutdown threshold of the electronic device is adjusted, to an adjusted identifier.

In a specific implementation process, the processor 802 is further configured to:

after setting the current shutdown threshold, which is corresponding to the current voltage, of the electronic device to the maximum application shutdown threshold of the at least one application shutdown threshold corresponding to the at least one application program, obtain a subsequent voltage of the battery, and determine whether the subsequent voltage is greater than a threshold voltage, where the threshold voltage is greater than the general shutdown threshold; and when the subsequent voltage is greater than the threshold voltage, a setting unit sets the current shutdown threshold of the electronic device to the general shutdown threshold.

In order to resume a full-function running mode of the electronic device, the processor 802 is further configured to:

after the current shutdown threshold of the electronic device is set to the general shutdown threshold, adjust a running mode of the electronic device to a full-function mode in which all application programs are runnable, and set the global variable to an unadjusted identifier.

Varied manners and specific examples in the foregoing method for adjusting a shutdown threshold voltage are also applicable to the first type of electronic device in this embodiment. From the detailed description of the foregoing method for adjusting a shutdown threshold voltage, a person skilled in the art can clearly understand an implementation method for the first type of electronic device in this embodiment. Therefore, for brevity of this specification, details are not described herein again.

Figure 9:
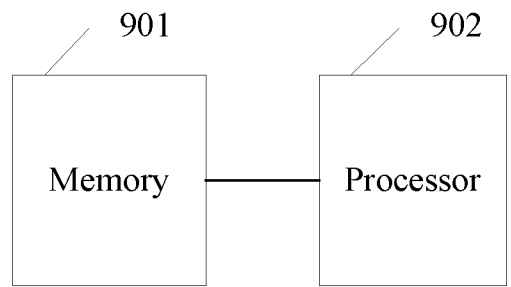
FIG. 9 is a structural block diagram of a second type of electronic device according to Embodiment 3 of the present invention.

Referring to FIG. 9, the embodiment of the present application further provides a second type of electronic device, including:

a memory 901, configured to store a minimum startup threshold and a general startup threshold of the electronic device; and a processor 902, configured to: respond to a startup operation of a user, and detect and obtain a current voltage of a battery of the electronic device; determine whether the current voltage is greater than the minimum startup threshold of the electronic device; when the current voltage is greater than the minimum startup threshold, determine whether the current voltage is greater than the general startup threshold of the electronic device; and when the current voltage is not greater than the general startup threshold, control the electronic device to start a low-voltage startup process, so as to complete initialization of a minimum system and a display module of the electronic device.

In a specific implementation process, the processor 902 is further configured to:

after controlling the electronic device to start the low-voltage startup process, so as to complete initialization of the minimum system and the display module of the electronic device, obtain and display all available application programs, in the electronic device, of which application shutdown thresholds are less than or equal to the current voltage; and obtain at least one application program which is from all the available application programs and configured by the user, and set the at least one application program to a runnable state.

In order to prevent an abnormal shutdown of the electronic device after low-voltage startup and running, the processor 902 is further configured to:

when or after obtaining the at least one application program which is from all the available application programs and configured by the user, and setting the at least one application program to the runnable state, obtain at least one application shutdown threshold corresponding to the at least one application program; and set a current shutdown threshold of the electronic device to a maximum application shutdown threshold of the at least one application shutdown threshold.

Varied manners and specific examples in the foregoing startup method are also applicable to the second type of electronic device in this embodiment. From the detailed description of the foregoing startup method, a person skilled in the art can clearly understand an implementation method for the second type of electronic device in this embodiment. Therefore, for brevity of this specification, details are not described herein again.

In a specific implementation process, the functional units in FIG. 6 and FIG. 7 may be set in a same entity device, that is, by selecting different functional units according to requirements, the electronic device can implement not only shutdown threshold voltage adjustment but also low-voltage startup.

By using one or more of the technical solutions in the embodiments of the present application, the following technical effects can be achieved:

A current voltage of a battery of an electronic device is detected and obtained, and when the current voltage is greater than a lowest shutdown threshold of the electronic device but less than or equal to a general shutdown threshold of the electronic device, a current shutdown threshold of the electronic device is adjusted downward to a maximum application shutdown threshold, that is, a shutdown threshold of the electronic device is decreased. In this way, the electronic device can continue to run an application program of which an application shutdown threshold is less than or equal to the maximum application shutdown threshold, and more battery electricity of the electronic device is used, thereby solving a technical problem of low utilization of battery electricity confronting an electronic device in the prior art, and further achieving a technical effect of increasing utilization of battery electricity.

A person skilled in the art should understand that the embodiments of the present invention may be provided as a method, a system, or a computer program product. Therefore, the present invention may use a form of hardware only embodiments, software only embodiments, or embodiments with combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowchart and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for adjusting a shutdown threshold voltage, wherein the method comprises:
    obtaining a current voltage of a battery of an electronic device;
    upon determining the current voltage is greater than or equal to a lowest shutdown threshold of the electronic device and less than or equal to a general shutdown threshold of the electronic device, obtaining at least one piece of application information of at least one application program, wherein an application shutdown threshold of an application program corresponding to the at least one piece of application information is greater than the lowest shutdown threshold and less than or equal to the current voltage;
    based on the at least one piece of application information, setting a current shutdown threshold, which is corresponding to the current voltage, of the electronic device to a maximum application shutdown threshold of at least one application shutdown threshold corresponding to the at least one application program;
    controlling a shutdown of the electronic device and availability of application programs according to the current shutdown threshold;
    obtaining and displaying available application programs, in the electronic device, the available application programs having application shutdown thresholds less than or equal to the current voltage; and
    obtaining at least one application program from the available application programs and configured by the user, and setting the at least one application program to a runnable state.

2. The method according to claim 1, wherein the obtaining at least one piece of application information of at least one application program comprises:
    displaying available application programs, in the electronic device, wherein application shutdown thresholds of the available application programs are less than or equal to the general shutdown threshold; and
    determining whether a user configures the at least one application program which is from the available application programs; and
    upon determining the user configures the at least one application program which is from the available application programs, obtaining the at least one piece of application information of the at least one application program.

3. The method according to claim 1, further comprising:
    during or before the setting a current shutdown threshold closing and disabling unavailable application programs of which application shutdown thresholds are greater than the general shutdown threshold.

4. The method according to claim 1, wherein the application shutdown threshold comprises:
    a voltage value obtained according to the lowest shutdown threshold, an internal resistance of the battery, and a peak current corresponding to the application program.

5. The method according to claim 1, further comprising, after the setting the current shutdown threshold, shielding a shutdown event triggered by the current voltage, and setting to an adjusted identifier a global variable used for indicating the current shutdown threshold of the electronic device is adjusted.

6. The method according to claim 5, further comprising, after the setting a current shutdown threshold:
    obtaining a subsequent voltage of the battery;
    determining whether the subsequent voltage is greater than a threshold voltage, wherein the threshold voltage is greater than the general shutdown threshold; and
    upon determining the subsequent voltage is greater than the threshold voltage, setting the current shutdown threshold of the electronic device to the general shutdown threshold.

7. The method according to claim 6, further comprising, after the setting the current shutdown threshold of the electronic device to the general shutdown threshold, adjusting a running mode of the electronic device to a full-function mode in which all application programs are runnable, and setting the global variable to an unadjusted identifier.

8. A startup method, wherein the method comprises:
responding to a startup operation of a user,
detecting and obtaining a current voltage of a battery of an electronic device;
determining whether the current voltage is greater than a minimum startup threshold of the electronic device;
upon determining the current voltage is greater than the minimum startup threshold, further determining whether the current voltage is greater than a general startup threshold of the electronic device;
upon determining the current voltage is not greater than the general startup threshold, controlling the electronic device to start a low-voltage startup process, to thereby complete initialization of a minimum system and a display module of the electronic device, and
after the controlling the electronic device to start a low-voltage startup process:
  obtaining and displaying available application programs, in the electronic device, the available application programs having application shutdown thresholds less than or equal to the current voltage; and
  obtaining at least one application program from the available application programs and configured by the user, and setting the at least one application program to a runnable state.

9. The method according to claim 8, further comprising, during or after the obtaining the at least one application program and setting the at least one application program to a runnable state:
obtaining at least one application shutdown threshold corresponding to the at least one application program; and
setting a current shutdown threshold of the electronic device to a maximum application shutdown threshold of the at least one application shutdown threshold.

10. An electronic device, comprising:
at least one hardware processor;
a memory interface to the at least one hardware processor, the memory including instruction to control the at least one hardware processor to implement:
  a first obtaining unit, configured to obtain a current voltage of a battery of the electronic device;
  a second obtaining unit, configured to:
    determine whether the current voltage is greater than or equal to a lowest shutdown threshold and less than or equal to a general shutdown threshold of the electronic device;
    upon determining the current voltage is greater than or equal to the lowest shutdown threshold of the electronic device and less than or equal to the general shutdown threshold of the electronic device, obtain at least one piece of application information of at least one application program, wherein an application shutdown threshold of an application program corresponding to the at least one piece of application information is greater than the lowest shutdown threshold and less than or equal to the current voltage; and
  a setting unit, configured to set, according to the at least one piece of application information, a current shutdown threshold, which is corresponding to the current voltage, of the electronic device to a maximum application shutdown threshold of at least one application shutdown threshold corresponding to the at least one application program, to thereby control a shutdown of the electronic device and availability of application programs according to the current shutdown threshold.

11. The electronic device according to claim 10, wherein the second obtaining unit is configured to:
display available application programs, in the electronic device, wherein application shutdown thresholds of the available application programs are less than or equal to the general shutdown threshold; and
determine whether a user configures the at least one application program which is from the available application programs; and
upon determining the user configures the at least one application program which is from the available application programs, obtain the at least one piece of application information of the at least one application program.

12. The electronic device according to claim 10, wherein the at least one hardware processor further implements:
a closing unit, configured to: when or before the current shutdown threshold of the electronic device is set to the maximum application shutdown threshold of the at least one application shutdown threshold, close and disable unavailable application programs of which application shutdown thresholds are greater than the general shutdown threshold.

13. The electronic device according to claim 10, wherein the application shutdown threshold is a voltage value obtained according to the lowest shutdown threshold, an internal resistance of the battery, and a peak current corresponding to the application program.

14. The electronic device according to claim 10, wherein at least one hardware processor further implements:
a shielding unit, configured to: after the current shutdown threshold of the electronic device is set to the maximum application shutdown threshold of the at least one application shutdown threshold, shield a shutdown event triggered by the current voltage, and set a global variable, which is used for indicating whether the current shutdown threshold of the electronic device is adjusted, to an adjusted identifier.

15. The electronic device according to claim 14, wherein the at least one hardware processor further implements:
a third obtaining unit, configured to obtain a subsequent voltage of the battery after the current shutdown threshold of the electronic device is set to the maximum application shutdown threshold of the at least one application shutdown threshold; and
a determining unit, configured to determine whether the subsequent voltage is greater than a threshold voltage, wherein the threshold voltage is greater than the general shutdown threshold;
wherein when the subsequent voltage is greater than the threshold voltage, the setting unit sets the current shutdown threshold of the electronic device to the general shutdown threshold.

16. The electronic device according to claim 15, wherein the at least one hardware processor further implements:
an adjustment unit, configured to: after the current shutdown threshold of the electronic device is set to the general shutdown threshold, adjust a running mode of the electronic device to a full-function mode in which all application programs are runnable, and set the global variable to an unadjusted identifier.

17. An electronic device, comprising:
at least one hardware processor;
a memory interface to the at least one hardware processor, the memory including instruction to control the at least one hardware processor to implement:
  a detection unit, configured to respond to a startup operation of a user, and detect and obtain a current voltage of a battery of the electronic device;
  a first determining unit, configured to determine whether the current voltage is greater than a minimum startup threshold of the electronic device;
  a second determining unit, configured to: upon determining the current voltage is greater than the minimum startup threshold, determine whether the current voltage is greater than a general startup threshold of the electronic device; and
  a starting unit, configured to: upon determining the current voltage is not greater than the general startup threshold, control the electronic device to start a low-voltage startup process, to thereby complete initialization of a minimum system and a display module of the electronic device;
  a first obtaining unit, configured to: after the electronic device is controlled to start the low-voltage startup process, to thereby complete initialization of the minimum system and the display module of the electronic device, obtain and display available application programs, in the electronic device, of which application shutdown thresholds are less than or equal to the current voltage; and
  a running unit, configured to obtain at least one application program which is from the available application programs and configured by the user, and set the at least one application program to a runnable state.

18. The electronic device according to claim 17, wherein the at least one hardware processor further implements:
  a second obtaining unit, configured to: when or after the at least one application program which is from the available application programs and configured by the user is obtained, and the at least one application program is set to the runnable state, obtain at least one application shutdown threshold corresponding to the at least one application program; and
  a setting unit, configured to set a current shutdown threshold of the electronic device to a maximum application shutdown threshold of the at least one application shutdown threshold.

19. An electronic device, comprising:
a memory, configured to store application information of an application program in the electronic device; and
at least one hardware processor, configured to:
  obtain a current voltage of a battery of the electronic device;
  upon determining the current voltage is greater than or equal to a lowest shutdown threshold of the electronic device and less than or equal to a general shutdown threshold of the electronic device, obtain at least one piece of application information of at least one application program, wherein an application shutdown threshold of an application program corresponding to the at least one piece of application information is greater than the lowest shutdown threshold and less than or equal to the current voltage;
  set, according to the at least one piece of application information, a current shutdown threshold, which is corresponding to the current voltage, of the electronic device to a maximum application shutdown threshold of at least one application shutdown threshold corresponding to the at least one application program;
  control a shutdown of the electronic device and availability of application programs according to the current shutdown threshold;
  obtain and display available application programs, in the electronic device, the available application programs having application shutdown thresholds less than or equal to the current voltage; and
  obtain at least one application program from the available application programs and configured by the user, and setting the at least one application program to a runnable state.

20. The electronic device according to claim 19, wherein:
the electronic device further comprises a display, configured to display available application programs, in the electronic device, wherein application shutdown thresholds of the available application programs are less than or equal to the general shutdown threshold; and
the at least one hardware processor is further configured to:
  obtain the at least one piece of application information of the at least one application program is configured to: determine whether a user configures the at least one application program which is from the available application programs; and
  upon determining the user configures the at least one application program which is from the available application programs, obtain the at least one piece of application information of the at least one application program.

21. The electronic device according to claim 19, wherein the at least one hardware processor is further configured to:
  when or before setting the current shutdown threshold of the electronic device to the maximum application shutdown threshold of the at least one application shutdown threshold, close and disable unavailable application programs of which application shutdown thresholds are greater than the general shutdown threshold.

22. The electronic device according to claim 19, wherein the application shutdown threshold is a voltage value obtained according to the lowest shutdown threshold, an internal resistance of the battery, and a peak current corresponding to the application program.

23. The electronic device according to claim 19, wherein the at least one hardware processor is further configured to:
  after setting the current shutdown threshold of the electronic device to the maximum application shutdown threshold of the at least one application shutdown threshold, shield a shutdown event triggered by the current voltage, and set a global variable, which is used for indicating whether the current shutdown threshold of the electronic device is adjusted, to an adjusted identifier.

24. The electronic device according to claim 23, wherein the at least one hardware processor is further configured to:
  after setting the current shutdown threshold of the electronic device to the maximum application shutdown threshold of the at least one application shutdown threshold, obtain a subsequent voltage of the battery, and determine whether the subsequent voltage is greater than a threshold voltage, wherein the threshold voltage is greater than the general shutdown threshold; and upon determining the subsequent voltage is greater than the threshold voltage, set the current shutdown threshold of the electronic device to the general shutdown threshold.

25. The electronic device according to claim 24, wherein the at least one hardware processor is further configured to:
after the current shutdown threshold of the electronic device is set to the general shutdown threshold, adjust a running mode of the electronic device to a full-function mode in which all application programs are runnable, and set the global variable to an unadjusted identifier.

26. An electronic device, comprising:
a memory, configured to store a minimum startup threshold and a general startup threshold of the electronic device; and
at least one hardware processor, configured to:
respond to a startup operation of a user, and detect and obtain a current voltage of a battery of the electronic device; determine whether the current voltage is greater than the minimum startup threshold of the electronic device;
upon determining the current voltage is greater than the minimum startup threshold, determine whether the current voltage is greater than the general startup threshold of the electronic device;
upon determining the current voltage is not greater than the general startup threshold, control the electronic device to start a low-voltage startup process, to thereby complete initialization of a minimum system and a display module of the electronic device;
after controlling the electronic device to start the low-voltage startup process, obtain and display available application programs, in the electronic device, of which application shutdown thresholds are less than or equal to the current voltage; and
obtain at least one application program which is from the available application programs and configured by the user, and set the at least one application program to a runnable state.

27. The electronic device according to claim 26, wherein the at least one hardware processor is further configured to:
when or after obtaining the at least one application program, and setting the at least one application program to the runnable state, obtain at least one application shutdown threshold corresponding to the at least one application program; and
set a current shutdown threshold of the electronic device to a maximum application shutdown threshold of the at least one application shutdown threshold.

* * * * *